(12) United States Patent
Mazyar et al.

(10) Patent No.: US 9,816,026 B2
(45) Date of Patent: Nov. 14, 2017

(54) METHODS OF EXTRACTING HYDROCARBONS FROM SUBTERRANEAN FORMATIONS

(71) Applicant: Baker Hughes Incorporated, Houston, TX (US)

(72) Inventors: Oleg A. Mazyar, Katy, TX (US); Valery N. Khabashesku, Houston, TX (US); Oleksandr V. Kuznetsov, Sugar Land, TX (US); Michael H. Johnson, Katy, TX (US)

(73) Assignee: Baker Hughes, LLC, Houston, TX (US)

( * ) Notice: Subject to any disclaimer, the term of this patent is extended or adjusted under 35 U.S.C. 154(b) by 83 days.

(21) Appl. No.: 14/721,846

(22) Filed: May 26, 2015

(65) Prior Publication Data

US 2016/0348488 A1 Dec. 1, 2016

(51) Int. Cl.
  *E21B 43/16* (2006.01)
  *C09K 8/80* (2006.01)
  *C09K 8/58* (2006.01)
  *C09K 8/524* (2006.01)
  *C09K 8/68* (2006.01)

(52) U.S. Cl.
  CPC .............. *C09K 8/805* (2013.01); *C09K 8/524* (2013.01); *C09K 8/58* (2013.01); *C09K 8/68* (2013.01); *C09K 8/80* (2013.01)

(58) Field of Classification Search
  CPC ............ E21B 43/16; C09K 8/58; C09K 8/805
  See application file for complete search history.

(56) References Cited

U.S. PATENT DOCUMENTS

| 2010/0147515 A1 | 6/2010 | Hughes et al. |
| 2010/0300928 A1* | 12/2010 | Oates ................ C09K 8/588 208/14 |
| 2011/0030958 A1* | 2/2011 | Fedorov ............. C09K 8/68 166/305.1 |

(Continued)

FOREIGN PATENT DOCUMENTS

| WO | 2010070600 A1 | 6/2010 |
| WO | 2010076745 A1 | 7/2010 |
| WO | 2011088556 A1 | 7/2011 |

OTHER PUBLICATIONS

International Search Report for International Application No. PCT/US2016/032841 dated Aug. 22, 2016, 3 pages.

(Continued)

*Primary Examiner* — Silvana Runyan
(74) *Attorney, Agent, or Firm* — TraskBritt

(57) ABSTRACT

A method of extracting hydrocarbons from a subterranean formation comprises introducing a solution comprising a silicon-containing compound into the subterranean formation. The silicon-containing compound may comprise a terminal group comprising one of an alkanoate group, a fluoroalkanoate group, and a perfluoroalkanoate group, and one or more of an alkoxy group and a chlorine atom bonded to a silicon atom. The method comprises attaching the silicon-containing compound to one or more of formation surfaces of the subterranean formation to form an oleophilic surface on the one or more of the formation surfaces and the surfaces of proppant particles.

12 Claims, 4 Drawing Sheets

(56) References Cited

U.S. PATENT DOCUMENTS

2013/0292118 A1 11/2013 Nguyen
2015/0083416 A1 3/2015 Lant et al.

OTHER PUBLICATIONS

International Written Opinion for International Application No. PCT/US2016/032841 dated Aug. 22, 2016, 6 pages.
Cione et al., Deposition and Wettability of [bmim][triflate] on Self-Assembled Monolayers, j. Phys. Chem. C, vol. 113, (2009), pp. 2384-2392.
Vilt et al., Surface and Frictional Porperties of Two-Component Alkylsilane Monolayers and Hydroxyl-Terminated Monolayers on Silidon, J. Phys. Chem. C, vol. 113, (2009), pp. 14972-14977.

* cited by examiner

METHODS OF EXTRACTING HYDROCARBONS FROM SUBTERRANEAN FORMATIONS

TECHNICAL FIELD

Embodiments of the disclosure relate generally to methods of extracting hydrocarbons from subterranean formations. More particularly, embodiments of the disclosure relate to methods of reducing asphaltene deposition within a subterranean formation and increasing the recovery of hydrocarbons therefrom.

BACKGROUND

Over the production lifetime of a completed wellbore, hydrocarbons may be recovered (i.e., produced) from one or more subterranean formations through which the wellbore extends. For example, natural formation pressures may drive hydrocarbons from the subterranean formation to a production string during what is known in the art as "primary recovery." Subsequently, as production from the subterranean formation decreases, or in some instances during initial completion of a well, the formation may be stimulated to enhance the recovery of hydrocarbons therefrom. Stimulation methods such as, for example, hydraulic fracturing (i.e., "fracking") may be used to enhance hydrocarbon recovery from the subterranean formation. In hydraulic fracturing operations, hydraulic fractures are conventionally formed by injecting a fluid (e.g., water) containing additives and including a suspended proppant material (e.g., sand, ceramics, etc.) into a targeted subterranean formation under elevated pressure conditions sufficient to cause the hydrocarbon-bearing formation material to fracture. The fracturing fluid carries the suspended proppant into the fractures where the proppant remains as pressure is reduced, maintaining open channels in the formation through which reservoir fluid (e.g., oil or gas) may pass.

The volume and rate of hydrocarbon recovery from the subterranean formation may depend, at least in part, on the porosity and permeability of the subterranean formation, the size of the fractures formed during hydraulic fracturing, and on fluid properties (e.g., viscosity, composition, etc.) of the hydrocarbons to be produced. Prior to traveling through the production string and to a surface location above the subterranean formation, hydrocarbons travel through a porous network of the pores of the subterranean formation (e.g., sand, clay, sandstone, limestone, etc.) and through any fractures formed during the hydraulic fracturing. However, asphaltenes within the hydrocarbons may be attracted to formation surfaces of the subterranean formation and to surfaces of proppant particles holding the fractures open, potentially agglomerating and blocking the pores and partially, if not fully, blocking fractures through which the hydrocarbons travel during recovery. Such blocked pores and fractures may decrease the permeability of the subterranean formation and the recovery of the hydrocarbons from the subterranean formation.

BRIEF SUMMARY

Embodiments disclosed herein include methods of extracting hydrocarbons from a subterranean formation. For example, in accordance with one embodiment, a method of extracting a hydrocarbon material from a subterranean formation comprises introducing a solution comprising a silicon-containing compound into a subterranean formation, the silicon-containing compound comprising a terminal group comprising one of an alkanoate group, a fluoroalkanoate group, and a perfluoroalkanoate group, and one or more of an alkoxy group and a chlorine atom bonded to a silicon atom. The method further comprises attaching the silicon-containing compound to one or more of formation surfaces of the subterranean formation and surfaces of proppant particles within fractures of the subterranean formation to form an oleophilic surface on the one or more of the formation surfaces and the surfaces of proppant particles.

In additional embodiments, a method of extracting hydrocarbons from a subterranean formation comprises introducing into a subterranean formation a solution comprising a silicon-containing compound having the following structure:

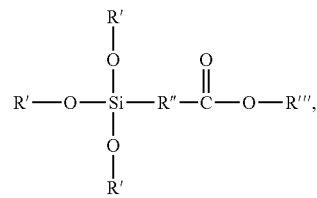

wherein each R' group comprises one of an alkoxy group, a hydroxyl group, an alkyl group, and a hydrogen atom, R" comprises one of an alkyl group and a functionalized alkyl group, and R''' comprises one of an alkyl group, a fluorinated alkyl group, and a perfluoroalkyl group. The method further comprises extracting hydrocarbons from the subterranean formation.

In further embodiments, a method of extracting a hydrocarbon from a subterranean formation comprises forming an oleophilic surface on one or more of formation surfaces of a subterranean formation and surfaces of proppant particles within the subterranean formation, removing hydrocarbons from the subterranean formation while the oleophilic surface is on one or more of the formation surfaces and the surfaces of the proppant particles, hydrolyzing the oleophilic surface and forming a hydrophilic surface on one or more of the formation surfaces and the surfaces of the proppant particles, and removing additional hydrocarbons from the subterranean formation while the hydrophilic surface is on one or more of the formation surfaces and the surfaces of the proppant particles.

DETAILED DESCRIPTION

Figure 1A:
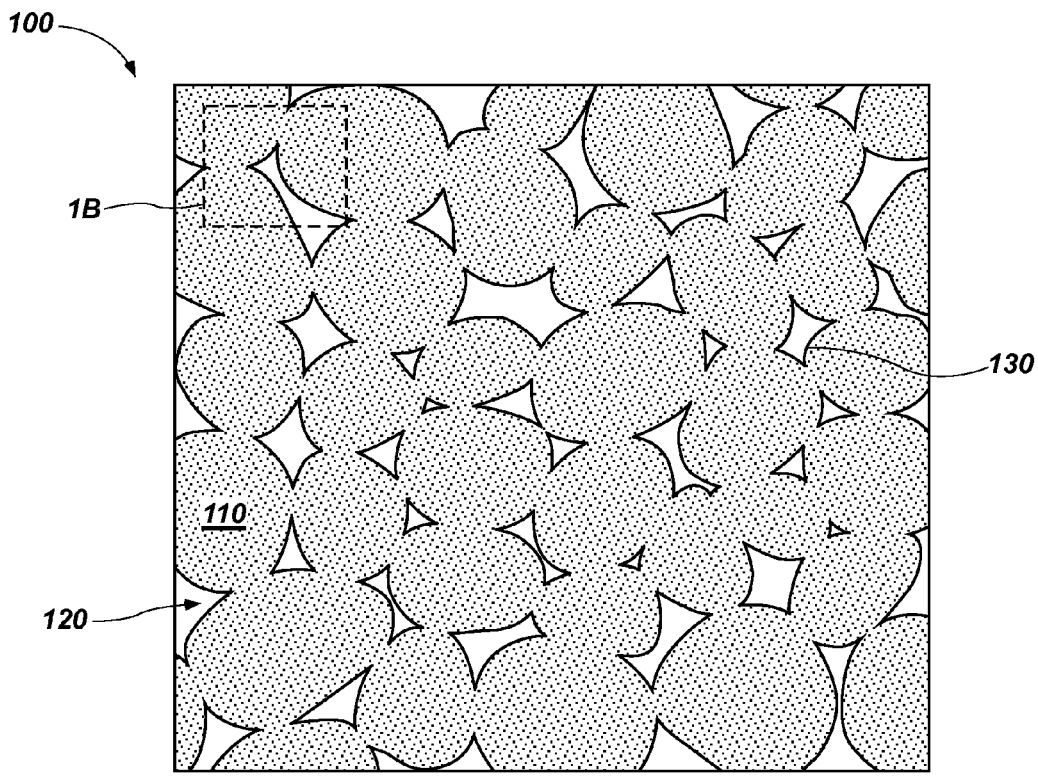
FIG. 1A is a simplified cross-sectional view illustrating of a portion of a subterranean formation.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for recovering hydrocarbons from a hydrocarbon-containing subterranean formation. Only those process acts and structures necessary to understand the embodiments of the disclosure are described in detail below. A person of ordinary skill in the art will understand that some conventional process components (e.g., pumps, controllers, tubular goods, packers, bridge plugs, line filters, valves, temperature detectors, flow detectors, pressure detectors, and the like) and use thereof are inherently disclosed herein and that adding various additional conventional process components and acts would be in accord with the disclosure. Additional acts or materials to treat a subterranean formation and extract a hydrocarbon material from the subterranean formation may be performed by conventional techniques.

As used herein, the term "alkyl group" means and includes a group including carbon-hydrogen bonds and may include groups having the general formula $C_nH_{(2n+1)}$, wherein n is an integer, such as methyl, ethyl, propyl, butyl, pentyl, hexyl, heptyl, octyl, nonyl, decyl, undecyl, dodecyl, etc., groups. Alkyl groups may be straight chained, branched, or ringed structures. An alkyl group may include between, for example, about one carbon atom and about thirty carbon atoms (i.e., n may be equal to between about one and about thirty). As used herein, the term "fluoroalkyl group" means and includes a group including at least one carbon-hydrogen bond and at least one carbon-fluorine bond. A fluoroalkyl group may have the general formula $C_nH_{(2n+1-x)}F_x$, wherein n is an integer between about one and about thirty and x is an integer between about one and about sixty. As used herein, the term "perfluoroalkyl group" means and includes a group including carbon-fluorine bonds having the general formula $C_nF_{(2n+1)}$, wherein n is an integer between about one and about thirty.

As used herein, the term "alkanoate" means and includes a carboxylic acid ester group bonded to an alkyl group. For example, an alkanoate may have the structure shown below:

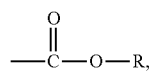

wherein R is an alkyl group, and the —COO— group is the carboxylic acid ester group. The alkyl group may be functionalized, such as with at least one of a hydroxyl group or other functional group. As used herein, the term "fluoroalkanoate" means and includes a carboxylic acid ester group bonded to a fluoroalkyl group and may have the structure above, wherein R is a fluoroalkyl group. As used herein, the term "perfluoroalkanoate" means and includes a carboxylic acid ester group bonded to a perfluoroalkyl group and may have the structure shown above, wherein R is a perfluoroalkyl group.

As used herein, the term "pore throat" means and includes a restricted opening disposed between and interconnecting relatively larger pore volumes within a porous material.

According to embodiments disclosed herein a solution comprising a silicon-containing compound is introduced into a subterranean formation. The silicon-containing compound may be configured to adhere to one or more of formation surfaces of the subterranean formation and surfaces of proppant particles within fractures of the subterranean formation. The silicon-containing compound, when attached to the formation surfaces and surfaces of proppant particles, may include at least one exposed functional group that reduces an affinity of asphaltenes to such surfaces. The at least one exposed functional group may be configured to impart oleophilic properties to surfaces to which the silicon-containing compound is attached. The at least one exposed functional group may form an oleophilic surface on formation surfaces (e.g., may cause the formation surfaces to be oil wet). Aqueous-based fluids within the pores may be repelled by the oil wet surfaces and may flow out of the pores, increasing an effective hydrocarbon permeability of the formation (e.g., a flowability of hydrocarbons out of the through pore throats and fractures). The silicon-containing compound may subsequently be hydrolyzed to convert the oleophilic surfaces to hydrophilic surfaces. Hydrophilic surfaces within the subterranean formation may increase the water wettability (e.g., hydrophilicity) of the subterranean formation and improve the efficiency of aqueous-based enhanced oil recovery stimulation processes such as water flooding, steam assisted gravity drainage, steam flooding, cyclic steam stimulation, polymer flooding, alkaline surfactant polymer flooding, carbon dioxide ($CO_2$) foam flooding, or other enhanced oil recovery stimulation processes. An aqueous-based stimulation fluid may more effectively sweep the subterranean formation when the surfaces of the subterranean formation are hydrophilic. Water wet surfaces may repel hydrocarbons from the pores and increase hydrocarbon recovery from the subterranean formation. Accordingly, a rate of hydrocarbon recovery from the subterranean formation may be increased by forming oleophilic surfaces within the subterranean formation. An effectiveness of an aqueous-based stimulation process may be increased by converting the oleophilic surfaces to hydrophilic surfaces prior to stimulating the subterranean formation with an aqueous-based stimulation fluid.

Figure 1B:
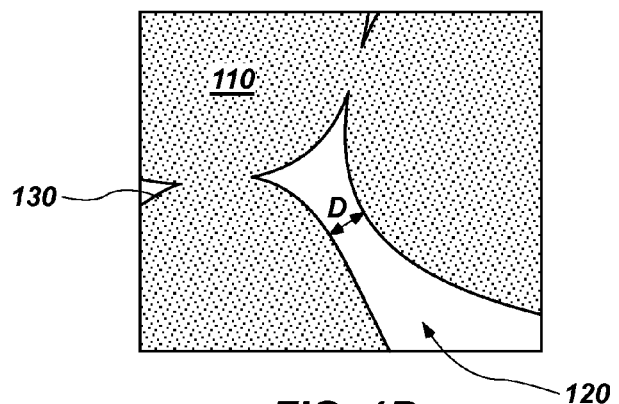
FIG. 1B is a simplified cross-sectional view illustrating a pore throat located between adjacent pores of the subterranean formation.

Referring to FIG. 1A, a portion of a hydrocarbon-containing subterranean formation 100 is shown. The subterranean formation 100 may include a network of pores 120 in the material of the subterranean formation 100 (e.g., grains of formation material 110). The subterranean formation 100 may be or comprise grains of sand, sandstone, clay, limestone, etc. Hydrocarbons may be located within the pores 120. During hydrocarbon recovery, hydrocarbons in the pores 120 may travel through fractures formed in the subterranean formation 100, to a production string, and to a surface of the subterranean formation 100. The hydrocarbon recovery rate and the pressure required to recover the hydrocarbons may be dependent on, among other factors, the size of the pores 120 and the size of pore throats (designated "D" in FIG. 1B). Referring to FIG. 1B, box 1B in FIG. 1A is shown illustrating a pore throat located between adjacent grains 110 of the subterranean formation 100.

Many producible hydrocarbons (e.g., heavy oils, oil sands, bitumen, etc.) within the subterranean formation 100 may contain asphaltenes. However, asphaltenes in such hydrocarbons may undesirably damage wellbore equipment, inhibit the flow of hydrocarbons from the subterranean formation 100, and increase a viscosity of produced hydrocarbons. Asphaltenes may also undesirably deposit on formation surfaces 130 within the pores 120 and pore throats, undesirably decreasing the permeability of the subterranean formation 100.

Figure 1C:
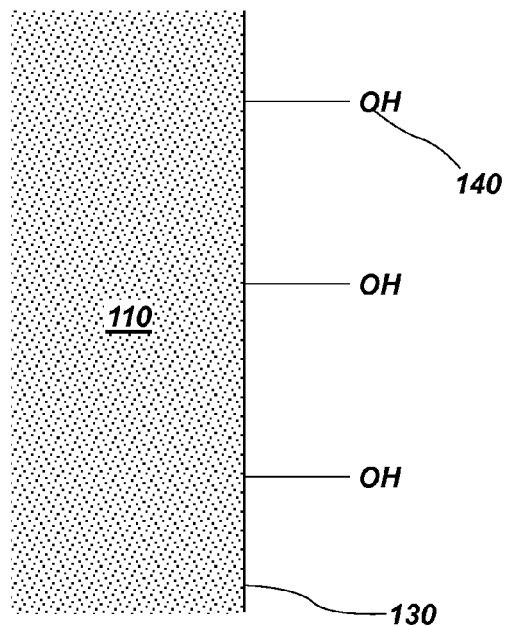
FIG. 1C is a simplified schematic illustrating a cross-sectional view of a pore of the subterranean formation.
Figure 2:
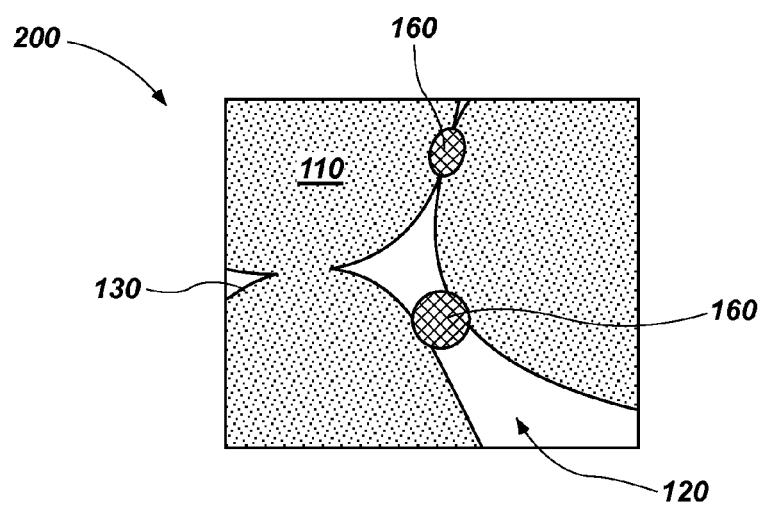
FIG. 2 is a simplified cross-sectional view illustrating a pore throat and pores restricted by the presence of asphaltenes.

Referring to FIG. 1C, a cross-sectional view of the formation material 110 is shown. The formation surfaces 130 within the pores 120 may include exposed hydroxyl groups 140 thereon. Asphaltenes 160 in the hydrocarbons may be attracted to the exposed hydroxyl groups 140 by van der Waals forces, coulombic interactions, ion-dipole interactions, dipole-dipole interactions, and other molecular forces. For example, with reference to FIG. 2, a portion of a partially restricted subterranean formation 200 is shown. Asphaltenes 160 may aggregate at and adhere to the formation surfaces 130 at the exposed hydroxyl groups 140 (FIG. 1C). As the asphaltenes 160 aggregate at the formation surfaces 130 (particularly at or near the pore throats), the pores 120 become narrow and the flow of hydrocarbons through the subterranean formation 200 is substantially restricted.

In some embodiments, a solution including a silicon-containing compound may be introduced into the subterranean formation 100 (FIG. 1A) to reduce deposition of asphaltenes 160 on the formation surfaces 130 within the pores 120. The silicon-containing compound may contact the formation surfaces 130 and may be formulated to react with the exposed hydroxyl groups 140 on the formation surfaces 130, reducing the likelihood of asphaltenes 160 adhering to the formation surfaces 130. Reaction of the exposed hydroxyl groups 140 with the silicon-containing compound may attach the silicon-containing compound to the formation surfaces 130. The silicon-containing compound may include an oleophilic functional group that is formulated to be exposed when the silicon-containing compound is attached to the formation surfaces 130 within the pores 120.

The silicon-containing compound may be an ester. The silicon-containing compound may include at least one silicon atom bonded to at least one functional group configured to react with the exposed hydroxyl groups 140. Reaction between the at least one functional group and the exposed hydroxyl groups 140 may attach the silicon-containing compound to the formation surfaces 130. The silicon atom may also be bonded to another functional group including one or more of a terminal alkyl group, a terminal fluorinated alkyl group, and a terminal perfluoroalkyl group. The at least another functional group may exhibit oleophilic properties and a substantially negligible affinity to asphaltenes. The at least another functional group may be configured to be exposed when the silicon-containing compound is attached to the formation surface 130. In some embodiments, a bridge group, which may include an alkyl group, may separate the silicon atom from the another functional group.

In some embodiments, the silicon-containing compound may have the following structure:

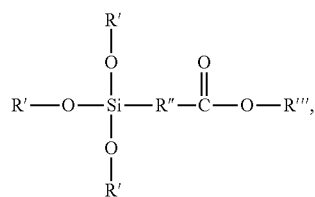

wherein R' may include one or more of an alkoxy group (e.g., methoxy (—$OCH_3$), ethoxy (—$OC_2H_5$), etc.), a hydrogen atom, a hydroxyl group, and an alkyl group; R'' includes an organic group that may include one or more functional groups (e.g., a hydroxyl group, an amino group, a carbonyl group, a carboxyl group (—COOH), etc.); and R''' includes an alkyl group (e.g., methyl, ethyl, propyl, butyl, etc.), a fluoroalkyl group such as a fluoromethyl group (—$CH_2F$), a fluoroethyl group (—$C_2H_4F$, —$CH_2CF_3$, —$CH_2CH_2CF_2CF_3$, etc.), a perfluoroalkyl group such as a trifluoromethyl group (—$CF_3$), a pentafluoroethyl group (—$C_2F_5$), etc. Each R' group may be the same or may be different.

At least one of the R' groups may be configured to react with the exposed hydroxyl groups 140 on the formation surfaces 130. Reaction of the R' group with exposed hydroxyl groups 140 may attach the silicon-containing compound to the formation surfaces 130. In some embodiments, each of the three R' groups may include the same group. In other embodiments, at least one of the R' groups is different than at least another of the R' groups. At least one of the R' groups may include one of an alkyl group and an alkoxy group. In some embodiments, the silicon atom is bonded to three alkoxy groups and the silicon-containing compound may include a trialkoxy compound, such as, for example, a trimethoxysilyl compound or a triethoxysilyl compound. In other embodiments, one or two of the R' groups may include one of an alkoxy group and an alkyl group, and the other of the R' groups may include one or more of a hydroxyl group and a hydrogen atom, and the silicon-containing compound may include a mono- or a di-alkoxy compound.

The R'' group may include at least one carbon atom and may include one or more additional functional groups. In some embodiments, the R'' group is a straight chain (i.e., linear) alkyl group having between about one and about thirty carbon atoms. In other embodiments, one or more of the carbon atoms of the R'' group may include one or more functional groups, such as an alkenyl group (C=C), a hydroxyl group, a carboxyl group, a carbonyl group (a compound including a carbon-oxygen double bond (C=O), such as a ketone, an aldehyde, a carboxylate group (RCOO)), an organohalide group (R—X, wherein R is a hydrocarbon and X is a halide, such as F, Cl, Br, or I), an amine group (a primary amine, a secondary amine, a tertiary amine), an amide group (organic amides (—NHCO—), a sulfur-containing group (such as a sulfonate group ($RSO_2O^-$—), a sulfate group ($SO_4^{2-}$—), etc.), or another functional group.

The R''' group may be configured to be exposed after the silicon-containing compound is attached to the formation surface 130. The R''' group may be configured to impart oleophilic properties to surfaces to which the silicon-containing compound is attached and may be configured to reduce an affinity of asphaltenes to such surfaces. The R''' group may include an alkyl group, a fluorinated alkyl group, or a perfluoroalkyl group. In embodiments where the R''' group is an alkyl group, the silicon-containing compound may include an alkanoate. Where the R''' group is a fluorinated alkyl group, the silicon-containing compound may include a fluorinated alkanoate. Where the R''' group is a perfluorinated alkyl group, the silicon-containing compound may include a perfluorinated alkanoate. The alkyl group, fluorinated alkyl group, and the perfluoroalkyl group may include between about one and about thirty carbon atoms. The R''' group may be a linear or a branched structure. A branched R''' group may reduce a likelihood of asphaltenes 160 contacting exposed hydroxyl groups 140 on the formation surfaces 130.

In embodiments where the R''' group includes a fluoroalkyl group, the R''' group may include one or more fluorine atoms bonded to one or more of the carbon atoms of the R''' group. Non-limiting examples of the R''' group include a fluoromethyl group (—$CH_2F$), a difluoromethyl group (—$CF_2H$), a fluoroethyl group (—$CH_2CH_2F$), a difluoroethyl group (—$CH_2CHF_2$), a trifluoroethyl group (—$CH_2CF_3$), a fluorodecyl group (—$C_{10}H_{20}F$), a difluorodecyl group (—$C_{10}H_{19}F_2$), a trifluorodecyl group (—$C_{10}H_{18}F_3$), a fluorododecyl group (—$C_{12}H_{24}F$), a difluorododecyl group (—$C_{12}H_{23}F_2$), a trifluorododecyl group (—$C_{12}H_{22}F_3$), etc. Each carbon atom of the R''' group may include zero, one, two, or three fluorine atoms. In some embodiments, each carbon atom of the R''' group may include the same or a different number of fluorine atoms. In some embodiments, the fluorine atoms are bonded to the most terminal carbon atom (i.e., the carbon atom most distant from the silicon atom).

Where the R''' group comprises a perfluoroalkyl group, the R''' group may have the general formula —$C_nF_{2n+1}$, where n is an integer between one and about thirty. Non-limiting examples of perfluoroalkyl groups include trifluoromethyl (—$CF_3$) and pentafluoroethyl (—$C_2F_5$).

In other embodiments, the silicon atom may be bonded to at least one chlorine atom. For example, the silicon-containing compound may have the following structure:

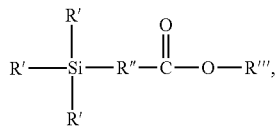

wherein at least one of the R' groups is chlorine, and R'' and R''' are the same as previously described. Thus, in some embodiments, each of the R' groups is a chlorine atom and the silicon-containing compound may comprise, for example, a trichlorosilane compound (—$SiCl_3$). In other embodiments, at least one of the R' groups is a chlorine atom and the other of the R' groups includes one or more of a hydrogen atom, a hydroxyl group, an alkyl group, and an alkoxy group. Silicon-containing compounds including a chlorine atom bonded to the silicon atom may be useful in a subterranean formation without a substantial amount of water.

Accordingly, the silicon-containing compound may include a compound such as a (trialkoxysilyl)alkyl alkanoate, a (trialkoxysilyl)alkyl fluoroalkanoate, a (trialkoxysilyl) alkyl perfluoroalkanoate, a trichlorosilyl alkyl alkanoate, a trichlorosilyl fluoroalkanoate, and a trichlorosilyl perfluoroalkanoate. In some embodiments, the silicon-containing compound comprises one or more of (trimethoxysilyl)methyl decanoate (($H_3C$)$_3$—Si—$CH_2$—$COOC_9H_{19}$), (trimethoxylsilyl)methyl dodecanoate (($H_3C$)$_3$—Si—$CH_2$—$COOC_{11}H_{23}$), (trimethoxysilyl)methyl fluorodecanoate (($H_3C$)$_3$—Si—$CH_2$—$COOC_9F_{(19-n)}H_n$, wherein n is an integer between one and eighteen), (trimethoxysilyl)methyl perfluorodecanoate (($H_3C$)$_3$—Si—$CH_2$—$COOC_9F_{21}$), (trichlorosilyl)methyl decanoate ($Cl_3$—Si—$CH_2$—$COOC_9H_{19}$), (trichlorosilyl)methyl fluorodecanoate ($Cl_3$—Si—$CH_2$—$COOCF_{(19-n)}H_n$, wherein n is an integer between one and eighteen), and (trichlorosilyl)methyl perfluorodecanoate ($Cl_3$—Si—$CH_2$—$COOC_9F_{21}$). Of course, in some embodiments, the silicon-containing compound may not include a trialkoxysilyl group or a trichlorosilyl group and one or two of the alkoxy groups or chlorine atoms may be replaced with an alkyl group (e.g., the silicon-containing compound may comprise a mono- or di-alkoxysilane or a mono- or di-chlorosilane).

As described above, at least one of the R' groups on each silicon-containing compound may be configured to interact with the exposed hydroxyl groups 140 on the formation surfaces 130. The silicon-containing compound may attach to the formation surfaces 130 in a silinization reaction or a condensation reaction. For example, the silicon-containing compound may be attached to the formation surfaces 130 by reacting a silicon-containing compound including at least one —O—R' group (e.g., an alkoxy group or a peralkoxy group (—O—O—R')) or a silicon-containing compound including at least one R' group including a chlorine atom with an exposed hydroxyl group 140 on the formation surfaces 130. The reaction may form the following structure:

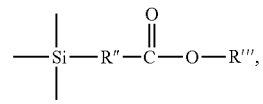

wherein the silicon atom is attached (e.g., bonded) to a formation surface 130. The silicon atom may also be bonded to an oxygen atom between the silicon-containing compound and an adjacent silicon-containing compound.

Figure 3:
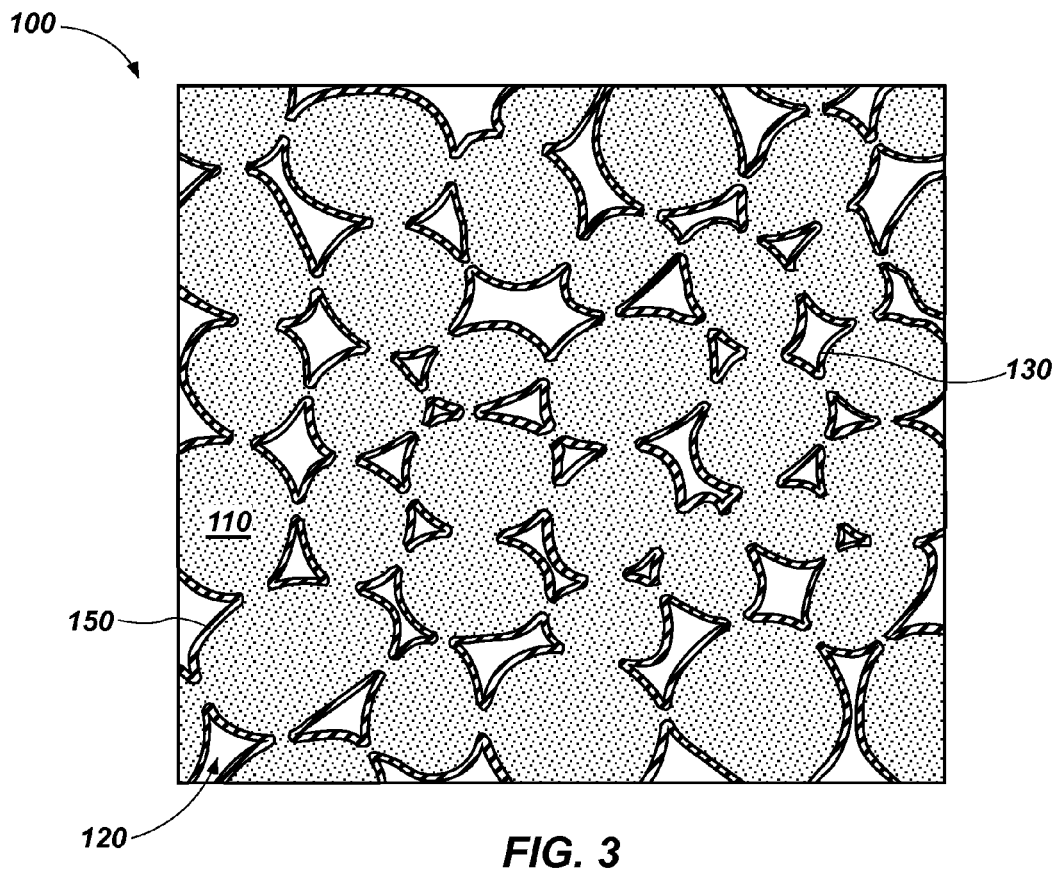
FIG. 3 is a simplified cross-sectional view illustrating oleophilic formation surfaces of the subterranean formation, in accordance with embodiments of the disclosure.

Referring to FIG. 3, reaction of the silicon-containing compound with exposed hydroxyl groups 140 may form an oleophilic surface 150 on the formation surfaces 130 within the pores 120. The oleophilic surface 150 may be a monolayer that substantially surrounds the pores 120 and may include exposed R''' groups. The oleophilic surface 150 may substantially reduce a likelihood of asphaltenes from interacting with (e.g., attaching to) the formation surfaces 130 within the pores 120.

Figure 4:
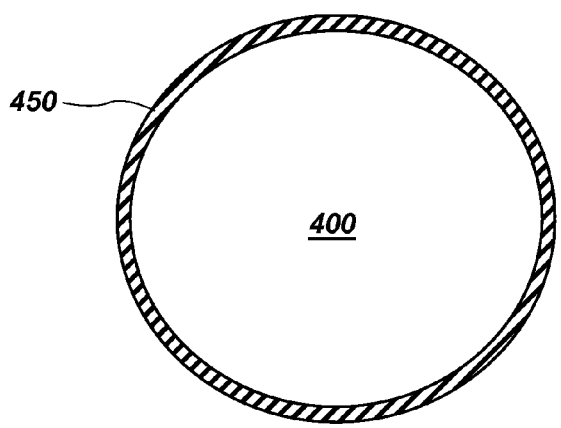
FIG. 4 is a simplified cross-sectional view illustrating a proppant particle including an oleophilic surface thereon, in accordance with embodiments of the disclosure.

In some embodiments, proppant particles may include the silicon-containing compound attached to surfaces thereof. Referring to FIG. 4, a proppant particle 400 may be coated with an oleophilic surface 450. For example, the proppant particle 400 may include exposed hydroxyl groups. The silicon-containing compound may react with the exposed hydroxyl groups to form the oleophilic surface 450 on the proppant particle 400. In some embodiments, the silicon-containing compound attaches to the surface of the proppant particles 400 similar to the mechanism by which the silicon-containing compound attaches to formation surfaces 130. For example, the silicon-containing compound may include one or more of an —O—R' group (e.g., an alkoxy group) and an R' group comprising a chlorine atom that may react with exposed hydroxyl groups on the surfaces of the proppant particle 400. Reaction of the silicon-containing compound with the exposed hydroxyl groups may form the following structure:

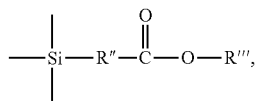

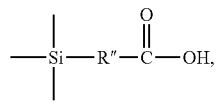

wherein the silicon atom is directly bonded to surfaces of the proppant particle 400. The silicon atom may also be bonded to an oxygen atom between the silicon-containing compound and an adjacent silicon-containing compound. The R''' group may be exposed on the oleophilic surface 450 and may substantially reduce an affinity of asphaltenes to the proppant particle 400.

In some embodiments, the silicon-containing compound may be attached to surfaces of proppant particles 400 prior to introducing the proppant particles 400 into the subterranean formation 100. The proppant particles 400 including the silicon-containing compound attached thereto may be introduced into the subterranean formation 100 during fracturing operations. In other embodiments, the silicon-containing compound may be attached to surfaces of the proppant particles 400 in situ, (e.g., while the proppant particles 400 are within fractures of the subterranean formation 100).

In some embodiments, after primary production, it may be desirable to stimulate the subterranean formation 100 to further increase recovery of hydrocarbons within the subterranean formation 100. For example, the subterranean formation 100 may be stimulated with methods such as water flooding, polymer flooding, alkaline surfactant polymer flooding, carbon dioxide ($CO_2$) foam flooding, steam assisted gravity drainage (SAGD), steam flooding, and cyclic steam stimulation (CSS), and related processes in which an aqueous carrier fluid (e.g., water, brine, steam, etc.) is injected into the subterranean formation 100 through injection wells to sweep hydrocarbons contained within the subterranean formation 100 toward the production well. The efficiency of such processes may at least partially depend on the ability of the stimulation fluid to sweep through the pores 120. However, if the formation surfaces 130 remain oleophilic, aqueous-based stimulation fluids may not effectively sweep through the pores 120. Thus, it may be desirable to modify the oleophilic surfaces 150, 450 to hydrophilic surfaces prior to, or during, such stimulation procedures.

Accordingly, the oleophilic surfaces 150, 450 may be converted to hydrophilic surfaces. For example, an exposed —O—R''' group of the oleophilic surfaces 150, 450 may be hydrolyzed to convert the oleophilic surface 150, 450 to a hydrophilic surface. In some embodiments, one or more of an exposed alkanoate group, an exposed fluoroalkanoate group, and an exposed perfluoroalkanoate group of the oleophilic surface 150, 450 may be hydrolyzed to convert the oleophilic surfaces 150, 450 to hydrophilic surfaces. Hydrolysis of the oleophilic surfaces 150, 450 may include exposing the oleophilic surfaces 150, 450 to an aqueous solution (e.g., water, brine, steam, etc.) in the presence of a base or an acid, such as dilute hydrochloric acid, dilute sulfuric acid, other acids, and combinations thereof. The hydrolysis reaction may proceed according to the following reaction:

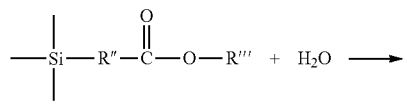

wherein the silicon atom of the hydrophilic surface is directly attached to a formation surface 130 or a surface of a proppant particle 400.

As shown above, the hydrophilic surfaces may include exposed carboxyl groups (—COOH groups). The hydrophilic surfaces may increase the mobility of aqueous solutions within the pores 120 and fractures of the subterranean formation 100, increasing the effectiveness of the aqueous-based stimulation process. Accordingly, the silicon-containing compound may be introduced into the subterranean formation 100 to form oleophilic surfaces 150 on the formation surfaces 130 and oleophilic surfaces 450 on surfaces of the proppant particles 400. The oleophilic surfaces 150, 450 may promote hydrocarbon recovery during primary production stages. Subsequently, the oleophilic surfaces 150, 450 may be hydrolyzed to form a hydrophilic surface on the formation surfaces 130 and surfaces of the proppant particles 400. Aqueous-based stimulation fluids may more effectively sweep the pores 120 when the formation surfaces 130 are hydrophilic, increasing hydrocarbon recovery during the stimulation processes.

Figure 5:
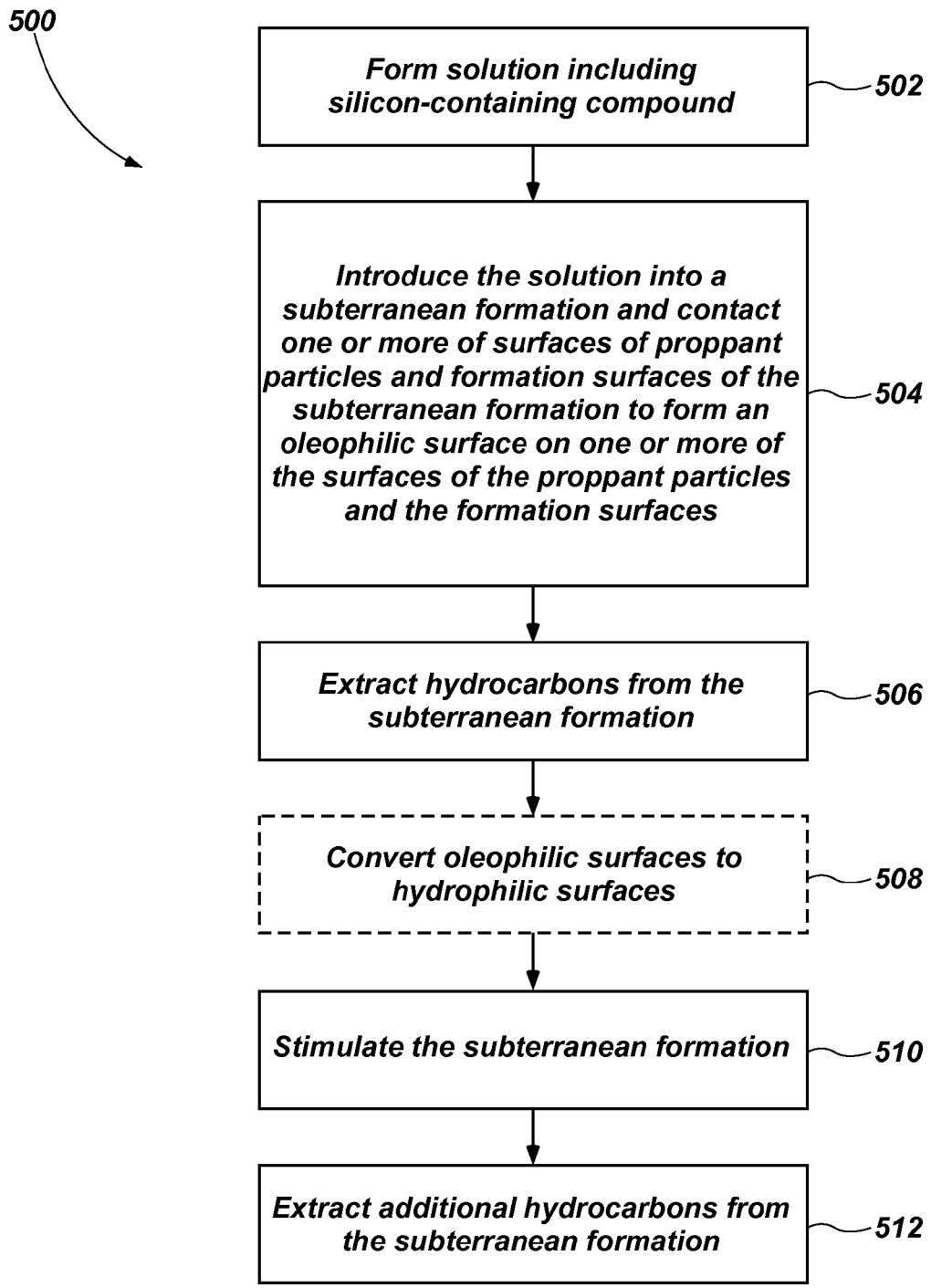
FIG. 5 is a simplified flow diagram depicting a method of extracting hydrocarbons from a subterranean formation, in accordance with embodiments of the disclosure.

Referring to FIG. 5, a simplified flow diagram illustrating a method 500 of obtaining a hydrocarbon material from a subterranean formation 100 in accordance with embodiments of the disclosure is shown. The method 500 may include a solution formation process 502 including forming a solution including a silicon-containing compound and a carrier fluid; a flooding process 504 including introducing the solution into the subterranean formation 100 and contacting one or more of surfaces of proppant particles and formation surfaces of the subterranean formation 100 with the solution to form oleophilic surfaces on one or more of the surfaces of the proppant particles and the formation surfaces; an extraction process 506 including extracting hydrocarbons from the subterranean formation 100; an optional conversion process 508 (shown in broken lines to indicate that the conversion process 508 is optional) including converting the oleophilic surfaces to hydrophilic surfaces; a stimulation process 510 including stimulating the subterranean formation 100; and an additional extraction process 512 including extracting additional hydrocarbons from the subterranean formation 100.

The solution formation process 502 may include forming a solution including the silicon-containing compound in a carrier fluid. The carrier fluid may include a non-aqueous solution and may include, for example, methane, propane, butane, natural gas, liquefied petroleum gas, liquefied natural gas, an alkane such as heptanes and octanes, ethyl benzene, ethanol, methanol, or other suitable organic carrier fluid. The silicon-containing compounds may not substantially react with (e.g., crosslink with) the carrier fluid.

The solution may be formulated to include a concentration of the silicon-containing compound ranging from between about 0.1 volume percent to about 10 volume percent, such as between about 0.1 volume percent and about 0.5 volume percent, between about 0.5 volume percent and about 1.0 volume percent, between about 1.0 volume percent and about 5.0 volume percent, or between about 5.0 volume percent and about 10 volume percent.

The solution may include more than one type of silicon-containing compound. For example, the solution may include a silicon-containing compound wherein the R''' group includes an alkyl group and may also include a silicon-containing compound wherein the R''' group includes one or more of a fluoroalkyl group and a perfluoroalkyl group. In other embodiments, the solution includes a silicon-containing compound including a chlorine atom and a silicon-containing compound including an alkoxy group.

With continued reference to FIG. 5, the flooding process 504 may include introducing the solution including the silicon-containing compound into the subterranean formation 100 and contacting one or more of the formation surfaces 130 of the subterranean formation 100 and surfaces of proppant particles with the solution. The flooding solution may be provided into the subterranean formation 100 through conventional processes. For example, a pressurized stream of the flooding solution may be pumped into an injection well extending to a desired depth in the subterranean formation 100, and may infiltrate (e.g., permeate, diffuse, etc.) into interstitial spaces of the subterranean formation 100.

During the flooding process 504, exposed hydroxyl groups on formation surfaces 130 within the pores 120 of the subterranean formation 100 and on surfaces of proppant particles may react with at least one R' group of the silicon-containing compound to form the oleophilic surfaces 150, 450. The oleophilic surfaces 150, 450 may include exposed R''' groups that may reduce an affinity of asphaltenes to the formation surfaces 130.

The extraction process 506 may include flowing (e.g., driving, sweeping, forcing, etc.) hydrocarbons from the subterranean formation 100 to the surface. The oleophilic surfaces 150, 450 may enhance hydrocarbon recovery during primary recovery. For example, some subterranean formations may include water-wet surfaces wherein surfaces of the subterranean formation (e.g., formation surfaces 130) and fractures are hydrophilic. The formation may include hydrophilic surfaces formed during drilling, hydraulic fracturing, and completion processes or hydrophilic surfaces naturally present within the subterranean formation 100. At least a portion of one or more aqueous-based fluids such as drilling fluids, completion fluids, workover fluids, and hydraulic fracturing fluids may be retained by the subterranean formation (e.g., remain trapped within the pores 120 and fractures) after such processes. However, the trapped fluids may undesirably damage the formation, such as by reducing an effective hydrocarbon permeability and reducing the flowability of the hydrocarbons from the subterranean formation 100. As an example, some of the trapped fluids create an obstruction in flow paths, such as in the pores 120 and the fractures. The oleophilic surfaces 150 (e.g., oil wet surfaces) may increase repulsive forces between the trapped aqueous-based fluids and the oleophilic surfaces 150, displacing the aqueous-based fluids and increasing the effective hydrocarbon permeability in the formation.

With continued reference to FIG. 5, the optional conversion process 508 may include converting the oleophilic surfaces 150, 450 to hydrophilic surfaces (water wet surfaces). In some embodiments, the conversion process 508 may be performed after primary recovery has been completed. The oleophilic surfaces 150, 450 may be hydrolyzed by contacting the oleophilic surfaces 150, 450 with an aqueous solution including a dilute acid.

The stimulation process 510 may include introducing a stimulation fluid into the subterranean formation 100 to displace (e.g., drive, sweep, force, etc.) additional hydrocarbons from within the subterranean formation 100 to the surface. The stimulation fluid may include an aqueous-based fluid, such as one or more of water, brine, and steam. Non-limiting examples of stimulation processes include water flooding, steam assisted gravity drainage, steam flooding, and cyclic steam stimulation. In some embodiments, aqueous-based stimulation fluids may be attracted to the hydrophilic surfaces, increasing the efficiency of the stimulation process. The hydrophilic surfaces may increase the efficiency of the stimulation process 510 by increasing the water-wettability of the subterranean formation 100 and increasing the mobility of the stimulation fluid within the subterranean formation 100. Repulsive forces between the water wet surfaces and any non-aqueous treatment fluids trapped within pores or fractures of the formation may cause the non-aqueous based treatment fluids to flow out of the pores and fractures of the subterranean formation. In other embodiments, where the oleophilic surfaces 150, 450 are not converted to hydrophilic surfaces, the stimulation fluid may be a non-polar solvent, such as an alkane (e.g., a liquefied butane).

The additional extraction process 512 may include flowing the additional hydrocarbons (e.g., stimulated hydrocarbons) from within the subterranean formation 100 to the surface. In embodiments where the oleophilic surfaces 150, 450 are converted to hydrophilic surfaces, the hydrophilic surfaces may increase the hydrocarbons swept and carried to the surface of the subterranean formation 100 by increasing repulsive forces between the hydrocarbons and the hydrophilic surfaces of the formation surfaces 130, the proppant surfaces, and surfaces of the fractures.

Additional non-limiting example embodiments of the disclosure are set forth below.

Embodiment 1: A method of recovering a hydrocarbon material from a subterranean formation, the method comprising: introducing a solution comprising a silicon-containing compound into a subterranean formation, the silicon-containing compound comprising: a terminal group comprising one of an alkanoate group, a fluoroalkanoate group, and a perfluoroalkanoate group; and one or more of an alkoxy group and a chlorine atom bonded to a silicon atom; and attaching the silicon-containing compound to one or more of formation surfaces of the subterranean formation and surfaces of proppant particles within fractures of the subterranean formation to form an oleophilic surface on the one or more of the formation surfaces and the surfaces of proppant particles.

Embodiment 2: The method of Embodiment 1, wherein introducing a solution comprising a silicon-containing compound into a subterranean formation comprises introducing a solution comprising a silicon-containing compound having the following structure:

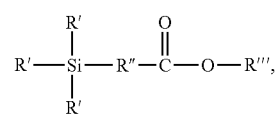

into the subterranean formation, wherein R' comprises a chlorine atom.

Embodiment 3: The method of Embodiment 1 or Embodiment 2, wherein introducing a solution comprising a silicon-containing compound into a subterranean formation comprises introducing a solution comprising a silicon-containing compound including at least one fluorine atom into the subterranean formation.

Embodiment 4: The method of Embodiment 1, wherein introducing a solution comprising a silicon-containing compound into a subterranean formation comprises introducing a solution comprising a silicon-containing compound having the following structure:

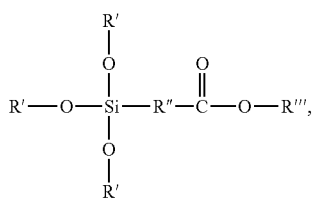

into the subterranean formation, wherein at least one of the R' groups comprises an alkoxy group, R'' comprises an alkyl group, and R''' comprises one of an alkyl group, a fluorinated alkyl group, and a perfluorinated alkyl group.

Embodiment 5: The method of Embodiment 1, wherein attaching the silicon-containing compound to one or more of formation surfaces of the subterranean formation and surfaces of proppant particles comprises reacting the one or more of an alkoxy group and the chlorine atom with an exposed hydroxyl group of one or more of the formation surfaces and the surfaces of the proppant particles.

Embodiment 6: The method of any one of Embodiments 1 through 5, further comprising forming a hydrophilic surface on one or more of the formation surfaces and the surfaces of the proppant particles after the silicon-containing compound is attached to one or more of the formation surfaces and the surfaces of the proppant particles.

Embodiment 7: The method of Embodiment 6, wherein forming a hydrophilic surface comprises hydrolyzing the alkanoate group.

Embodiment 8: The method of Embodiment 7, further comprising performing one or more of water flooding, polymer flooding, alkaline surfactant polymer flooding, carbon dioxide foam flooding, steam assisted gravity drainage, steam flooding, and cyclic steam stimulation after hydrolyzing the alkanoate group.

Embodiment 9: A method of extracting hydrocarbons from a subterranean formation, the method comprising: introducing into a subterranean formation a solution comprising a silicon-containing compound having the following structure:

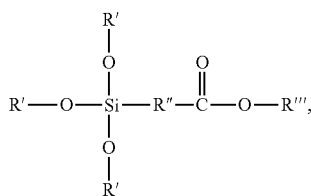

wherein each R' group comprises one of an alkoxy group, a hydroxyl group, an alkyl group, and a hydrogen atom, R'' comprises one of an alkyl group and a functionalized alkyl group, and R''' comprises one of an alkyl group, a fluorinated alkyl group, and a perfluoroalkyl group; and extracting hydrocarbons from the subterranean formation.

Embodiment 10: The method of Embodiment 9, wherein introducing into a subterranean formation a solution comprises introducing a solution comprising a silicon-containing compound wherein the R''' group comprises an alkyl group.

Embodiment 11: The method of Embodiment 9, wherein introducing into a subterranean formation a solution comprises introducing a solution comprising a silicon-containing compound wherein the R''' group comprises a fluorinated alkyl group.

Embodiment 12: The method of Embodiment 9, wherein introducing into a subterranean formation a solution comprises introducing a solution comprising a silicon-containing compound wherein the R''' group comprises a perfluoroalkyl group.

Embodiment 13: The method of any one of Embodiments 9 through 12, wherein introducing into a subterranean formation a solution comprises introducing a solution comprising a silicon-containing compound wherein at least one of the R' groups comprises an alkyl group.

Embodiment 14: The method of any one of Embodiments 9 through 13, further comprising introducing into the subterranean formation proppant particles suspended within the solution and having the following compound structure on surfaces thereof:

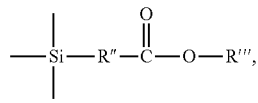

wherein the silicon atom of the compound structure is bonded to the proppant particle.

Embodiment 15: The method of any one of Embodiments 9 through 14, further comprising reacting the silicon-containing compound with exposed hydroxyl groups on formation surfaces of the subterranean formation to form an oleophilic surface comprising exposed R''' groups on the formation surfaces.

Embodiment 16: The method of Embodiment 15, further comprising hydrolyzing the exposed R''' groups and forming a compound having the following structure:

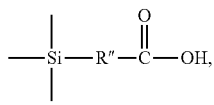

attached to the formation surfaces.

Embodiment 17: A method of extracting a hydrocarbon from a subterranean formation, the method comprising: forming an oleophilic surface on one or more of formation surfaces of a subterranean formation and surfaces of proppant particles within the subterranean formation; removing hydrocarbons from the subterranean formation while the oleophilic surface is on one or more of the formation surfaces and the surfaces of the proppant particles; hydrolyzing the oleophilic surface and forming a hydrophilic surface on one or more of the formation surfaces and the surfaces of the proppant particles; and removing additional hydrocarbons from the subterranean formation while the hydrophilic surface is on one or more of the formation surfaces and the surfaces of the proppant particles.

Embodiment 18: The method of Embodiment 17, further comprising removing at least one of a drilling fluid, a completion fluid, a workover fluid, and a hydraulic fracturing fluid from the subterranean formation while the oleophilic surface is on one or more of the formation surfaces and the surfaces of the proppant particles.

Embodiment 19: The method of Embodiment 17 or Embodiment 18, wherein hydrolyzing the oleophilic surface comprises forming an exposed carboxyl group on one or more of the formation surfaces and the surfaces of the proppant particles.

Embodiment 20: The method of any one of Embodiments 17 through 19, further comprising contacting the hydrophilic surface on one or more of the formation surfaces and the surfaces of the proppant particles with one or more of water, brine, and steam to remove hydrocarbons from the subterranean formation.

Although the foregoing description contains many specifics, these are not to be construed as limiting the scope of the disclosure, but merely as providing certain embodiments. Similarly, other embodiments may be devised that do not depart from the scope of the invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to embodiments of the disclosure, as described and illustrated herein, which fall within the meaning and scope of the claims, are encompassed by the invention.

What is claimed is:

1. A method of extracting a hydrocarbon material from a subterranean formation, the method comprising:
   introducing a solution comprising a silicon-containing compound into a subterranean formation, the silicon-containing compound comprising:
   a silicon atom:
   at least one R' group bonded to the silicon atom, the at least one R' group selected from the group consisting of an alkoxy group and a chlorine atom:
   an R'' group bonded to the silicon atom: and
   a terminal group bonded to the R'' group, the terminal group selected from the group consisting of a perfluoroalkanoate group, wherein the terminal group comprises:
   an ester group bonded to the R'' group: and
   a group selected from the group consisting of a perfluoroalkyl group bonded to the ester group: and
   attaching the silicon-containing compound to one or more of formation surfaces of the subterranean formation and surfaces of proppant particles within fractures of the subterranean formation to form an oleophilic surface on the one or more of the formation surfaces and the surfaces of proppant particles.

2. The method of claim 1, wherein introducing a solution comprising a silicon-containing compound into a subterranean formation comprises introducing a solution comprising a silicon-containing compound having the following structure:

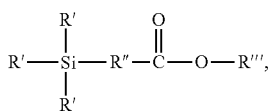

into the subterranean formation, wherein R' comprises a chlorine atom.

3. The method of claim 1, wherein introducing a solution comprising a silicon-containing compound into a subterranean formation comprises introducing a solution comprising a silicon-containing compound including at least one fluorine atom into the subterranean formation.

4. The method of claim 1, wherein introducing a solution comprising a silicon-containing compound into a subterranean formation comprises introducing a solution comprising a silicon-containing compound having the following structure:

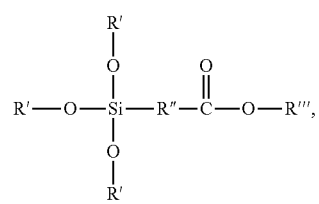

into the subterranean formation, wherein at least one of the R1 groups comprises an alkyl group, R'' comprises an alkyl group, and R''' comprises a group selected from the group consisting of a perfluoroalkyl group.

5. The method of claim 1, wherein attaching the silicon-containing compound to one or more of formation surfaces of the subterranean formation and surfaces of proppant particles comprises reacting the at least one R' group with an exposed hydroxyl group of one or more of the formation surfaces and the surfaces of the proppant particles.

6. The method of claim 1, further comprising forming a hydrophilic surface on one or more of the formation surfaces and the surfaces of the proppant particles after the silicon-containing compound is attached to one or more of the formation surfaces and the surfaces of the proppant particles.

7. The method of claim 6, wherein forming a hydrophilic surface comprises hydrolyzing the perfluoroalkanoate group.

8. The method of claim 7, further comprising performing one or more of water flooding, polymer flooding, alkaline surfactant polymer flooding, carbon dioxide foam flooding, steam assisted gravity drainage, steam flooding, and cyclic steam stimulation after hydrolyzing the perfluoroalkanoate group.

9. The method of claim 1, further comprising:
   extracting hydrocarbons from the subterranean formation while the oleophilic surface remains on the one or more of the formation surfaces and the surfaces of the proppant particles; and after extracting hydrocarbons from the subterranean formation, forming a hydrophilic surface on one or more of the formation surfaces and the surfaces of the proppant particles while the silicon-containing compound remains attached to the one or more of the formation surfaces and the surfaces of the proppant particles.

10. The method of claim 1, wherein attaching the silicon-containing compound to one or more of formation surfaces of the subterranean formation and surfaces of proppant particles within fractures of the subterranean formation comprises bonding the silicon atom of the silicon-containing compound directly to an exposed oxygen atom on the one or more of the formation surfaces of the subterranean formation and surfaces of proppant particles.

11. The method of claim 1, wherein introducing a solution comprising a silicon-containing compound into a subterranean formation comprises introducing a solution comprising the silicon-containing compound dispersed in non-aqueous carrier fluid.

12. The method of claim 1, further comprising selecting the silicon-containing compound to consist of the following structure:

$$\begin{array}{c} R' \\ | \\ O \quad\quad O \\ | \quad\quad \| \\ R'-O-Si-R''-C-O-R''', \\ | \\ O \\ | \\ R' \end{array}$$

wherein at least one of the R' groups comprises an alkyl group, R'' comprises an alkyl group, and R''' is selected from the group consisting of a perfluoroalkyl group.

* * * * *